United States Patent [19]

Orain

[11] 4,178,778
[45] Dec. 18, 1979

[54] HOMOKINETIC JOINT OF THE TRIPOD TYPE

[75] Inventor: Michel Orain, Conflans Sainte Honorine, France

[73] Assignee: Glaenzer Spicer, Poissy, France

[21] Appl. No.: 880,489

[22] Filed: Feb. 23, 1978

[30] Foreign Application Priority Data

Mar. 4, 1977 [FR] France .................. 77 06428

[51] Int. Cl.² .............................................. F16D 3/30
[52] U.S. Cl. ........................................ 64/21; 64/9 R; 64/1 C
[58] Field of Search ................... 64/21, 7, 8, 9 R, 1 C

[56] References Cited

U.S. PATENT DOCUMENTS

| | | | |
|---|---|---|---|
| 2,861,438 | 11/1958 | Villard | 64/21 |
| 2,897,663 | 8/1959 | Anderson | 64/21 |
| 3,310,960 | 3/1967 | Cull | 64/21 |
| 3,564,868 | 2/1971 | Wildhaber | 64/21 |
| 3,906,747 | 9/1975 | Orain | 64/21 |
| 4,003,218 | 1/1977 | Filderman | 64/9 R |
| 4,068,499 | 1/1978 | Sharp | 64/8 |

FOREIGN PATENT DOCUMENTS 2355823  5/1975  Fed. Rep. of Germany ................ 64/8

*Primary Examiner*—Charles J. Myhre
*Assistant Examiner*—R. C. Turner
*Attorney, Agent, or Firm*—Wenderoth, Lind & Ponack

[57] ABSTRACT

The joint comprises a tripod connected to one of the two shafts to be coupled by the joint and defining three trunnions on which three part-spherical rollers are mounted. A second member of the joint is connected to the other shaft and defines three raceways in which the rollers are received. The tripod constitutes a member which is distinct from the shaft associated with the tripod and is connected to this associated shaft by an auxiliary homokinetic coupling. The latter is capable of operating at an angle of displacement which is small relative to the maximum angle of displacement of the two shafts coupled by the joint.

13 Claims, 5 Drawing Figures

HOMOKINETIC JOINT OF THE TRIPOD TYPE

The present invention relates to homokinetic joints or couplings employed for a transmission between a first shaft or other driving means and a second shaft or other driven means and more particularly to such a joint of the tripod type.

It is known that a tripod joint comprises a first member or tripod connected to one of the two shafts to be coupled and defining three trunnions on which are mounted three part-spherical rollers, and a second member connected to the other shaft and defining three raceways in which the rollers carried by the tripod are received.

It is known that when such a joint operates with an angular displacement between the shafts, the axis of the shaft rigid with the tripod effects in the course of the rotation a circular motion, termed "offset motion," about a mean position. This circular motion has two drawbacks:

it limits the maximum angular displacement between the shafts of the joint owing to interference between the shaft rigid with the tripod and the free edge of the member defining the raceways;

in particular, in respect of joints which must operate at high speeds, it produces disturbances and vibrations which may be harmful, either in themselves, or because they modulate other vibrations produced, for example, by the engine of a vehicle provided with these joints.

A main object of the invention is to provide a tripod joint which has increased torque-transmitting capacity and angular displacement between the shaft and in which said offset motion of the shaft connected to the tripod is eliminated.

This result is obtained in a joint of the aforementioned type wherein the tripod constitutes a member distinct from the associated shaft and is connected to the latter by an auxiliary homokinetic coupling capable of operating at a given angle which is added to the maximum displacement angle of the joint.

According to other features of the invention:

the coupling is formed by two complementary sets of teeth formed respectively on the member defining the tripod and on a member rigid with the shaft associated with the tripod;

thrust means and axial retaining means are provided between the member defining the tripod and the associated shaft;

the mean lines of the raceways may be rectilinear or part-circular, depending on the different configurations of the joint.

Some of these configurations will be described hereinafter by way of example with reference to the accompanying drawings in which.

Figure 1:
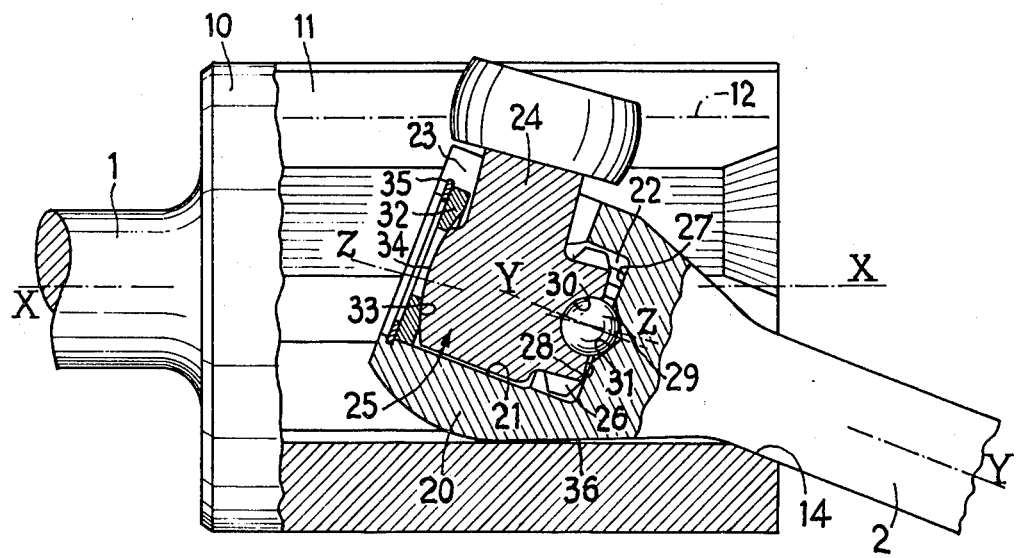
FIG. 1 is a longitudinal sectional view of a first embodiment of the improved joint according to the invention.

FIG. 1 shows a tripod joint for achieving a homokinetic transmission between two shafts 1 and 2 which are respectively driving and driven shafts. The shaft 1 is rigid with a bell member 10 of conventional construction formed by a roughly cylindrical member in which are formed three pairs of grooves 11 defining raceways which have a part-circular cross-sectional shape, the mean lines 12 of which raceways being straight lines parallel to the axis X—X of the shaft 1.

The driven shaft 2 having an axis Y—Y has at its end an enlargement 20 defining a cavity 21. An inner set of teeth 22 is formed in the zone of the enlargement adjacent the shaft 2. Also provided in this enlargement are three notches 23 for the passage of three trunnions 24 integral with a member 25 which is in the shape of a tripod and has an axis Z—Z. The member 25 has a set of teeth 26 meshed with the set of teeth 22 on the shaft 2. The two sets of teeth are backed off in the known manner to permit operation thereof at a small angular displacement which may reach about 5°. Provided between the inner end 27 of the cavity 21 and the adjacent face 28 of the tripod is a thrust device allowing angular displacement of the tripod relative to the shaft 2. This device is here formed by a ball 29 received in a part-spherical cavity 30 in the tripod and in a conical cavity 31 in the inner end 27.

Axial retaining means are provided between the tripod 25 and the associated shaft 2, these means being here formed by a thrust washer 32 defining a thrust surface 33 of part-spherical shape cooperating with a similar surface 34 on the tripod. The washer 32 is held in position by a ring 35.

In the known manner, the free edge 13 of the bell is chamfered at 14 so as to increase the possible angular displacement of the joint. The shaft 2 also has for this purpose an intermediate zone 36 of roughly frustoconical shape, whereas the enlargement 20 has a roughly part-spherical outer shape at least in the zone thereof between the notches 23.

When the joint operates with an angular displacement between the shafts, the offset motion usually undergone by the shaft connected to the tripod is here absorbed by the angular displacement between the tripod proper 25 and the shaft 2 with which it is associated. The phenomenon usually designated by the term "offset" is thus eliminated. This is a very important advantage, in particular when the joint must operate at high speed. As the orbital or circular motion is avoided, the connection between the two shafts 1 and 2 is perfectly concentric and insensitive to the transfer of torque between these two shafts. Moreover, the means employed are extremely simple and the efficiency and torque-transmitting capacity of the joint are in no way affected by the modifications. Indeed, in the vast majority of the cases of utilization, the coupling having teeth 22, 26 operates at a very small angle, for example less than 30 minutes if the joint operates at a total displacement angle of 10°. Consequently, this auxiliary coupling does not introduce a noticeable mechanical loss and there is no danger of its being prematurely worn owing to the very small relative displacement of the engaged teeth 22 and 26.

Figure 2:
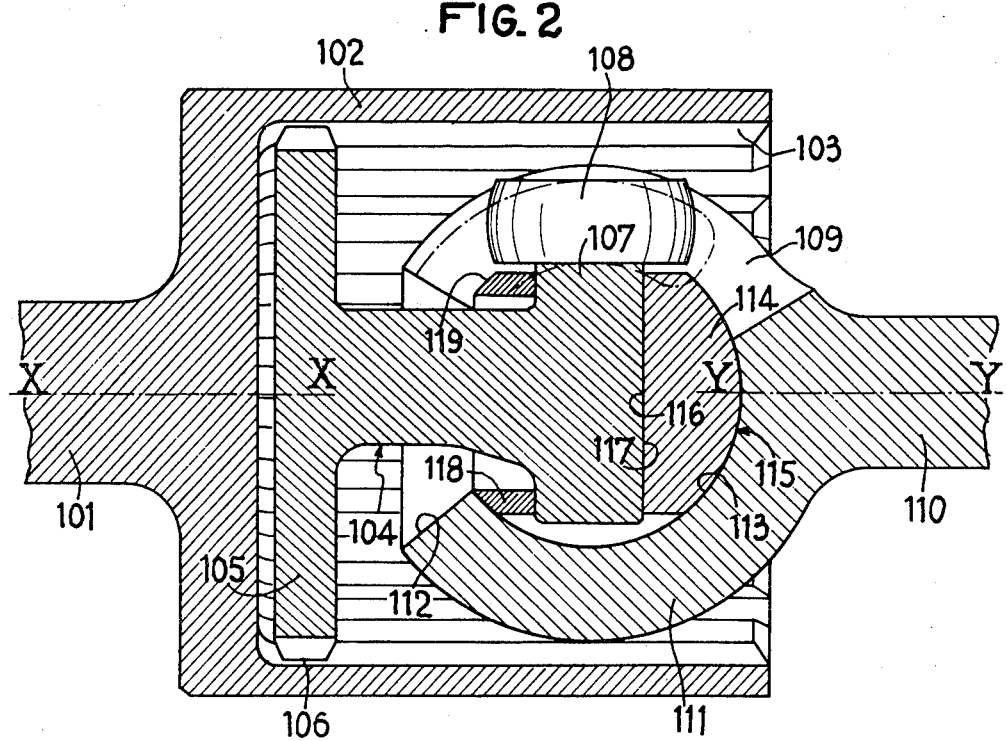
FIG. 2 is a longitudinal sectional view of a second embodiment.

The embodiment shown in FIG. 2 concerns a sliding joint in which a first shaft 101 having an axis X—X is rigid with a cylindrical barrel 102 having internal splines 103. Disposed in this cylindrical barrel is a tripod 104 comprising, at one end, a flange 105 defining teeth 106 engaged with the splines of the tube and, at the opposite end, three trunnions 107 on which part-spherical rollers 108 are mounted. These rollers are received in raceways 109 of part-circular sectional shape. The mean line of these raceways is here a segment of a circle centered on the axis Y—Y of the second shaft 110. These raceways are defined in a bell 111 having a part-spherical outer shape and a free edge 112 which is shaped in such manner as to avoid interferring with the shaft section of the tripod 104 disposed between the flange 105 and the trunnions 107. The bell 111 defines a part-spherical inner surface 113 which is employed for centering the tripod with respect to the bell. For this purpose, there is provided a thrust member 114 having a part-spherical dome-shaped surface 115, received in the bearing surface 113, and a planar thrust surface 116 bearing against the end face 117 of the tripod. A retaining washer 118 is also provided, a part-spherical portion 119 of which cooperates with the inner surface of the bell.

The operation of this joint is relatively simple to explain:

The mounting of the flange 106 having teeth in the splines 103 of hethe cylindrical barrel 102 allows a longitudinal sliding of the joint. When the latter operates with an angular displacement between the shafts, there is obtained the main advantage explained with respect to the first embodiment, namely the elimination of the orbital or circular motion of the shaft 110 associated with the tripod, this orbital motion being absorbed by the angular movement of small amplitude between the member 104 defining the tripod and the associated shaft 101.

Figure 4:
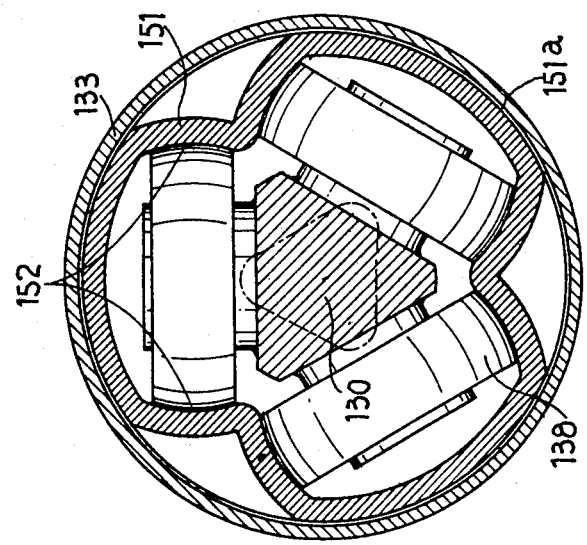
FIG. 4 is a sectional view taken on line 4—4 of FIG. 3.
Figure 3:
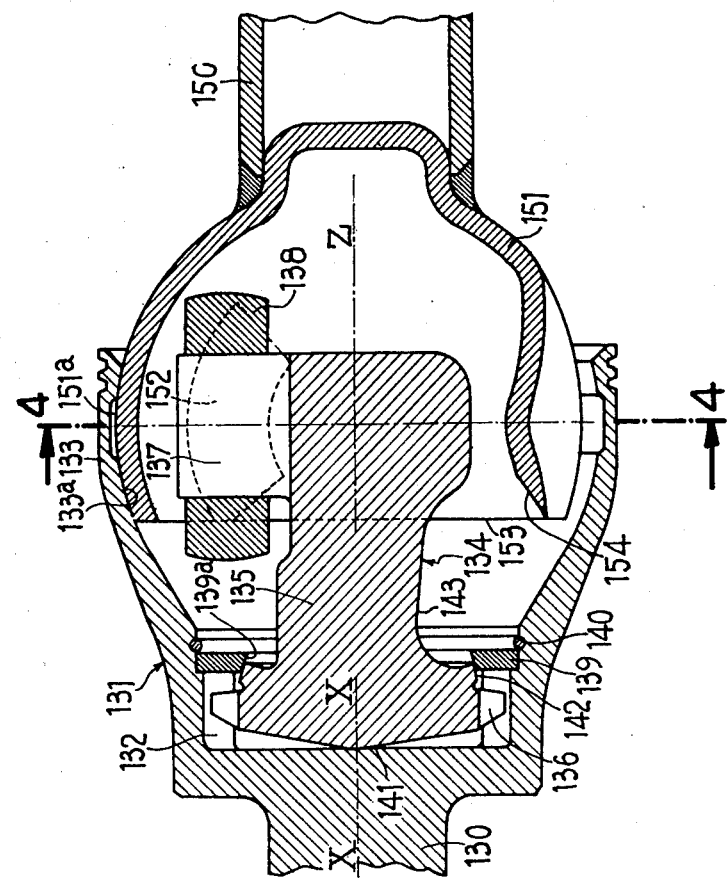
FIG. 3 is a longitudinal sectional view of a more elaborate third embodiment.
Figure 5:
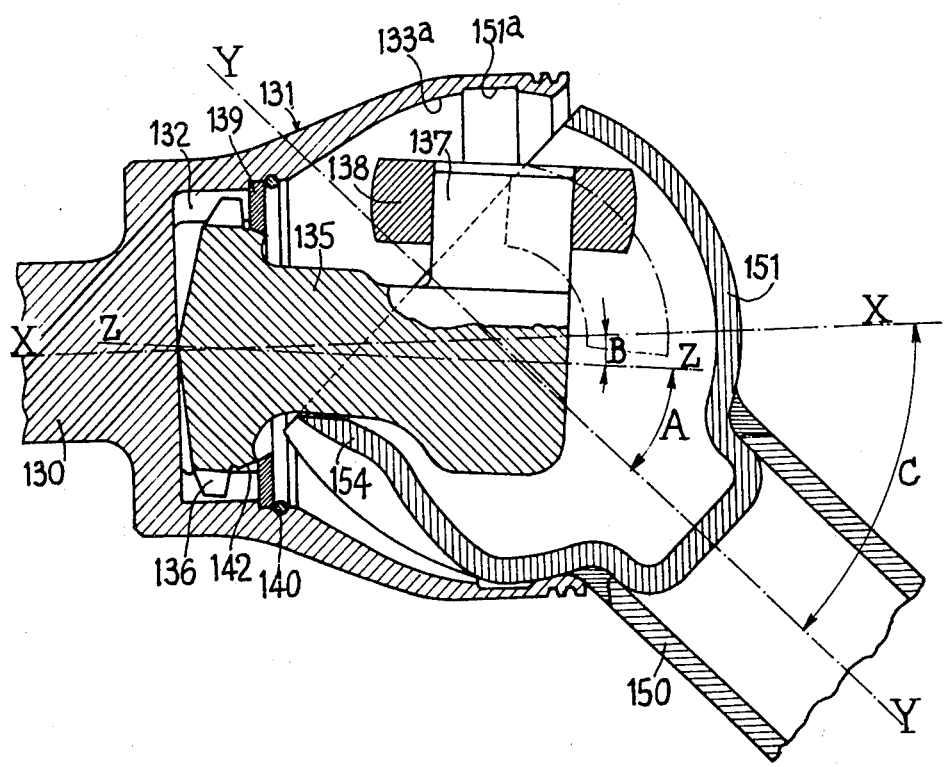
FIG. 5 is a longitudinal sectional view of the joint shown in FIG. 4 operating with the maximum angular displacement between the shafts.

FIGS. 3, 4 and 5 show a more elaborate third embodiment of such a joint which permits obtaining a large angular displacement between the shafts connected by the joint. This joint comprises a first shaft 130 carrying at the end thereof an enlargement 131 which defines an inner set of teeth 132 and a bowl 133 the inner surface 133$^a$ of which has a part-spherical shape. The tripod proper 134 is distinct from the shaft 130 and comprises a shaft section 135 defining, at one end, a set of teeth 136 engaged with the teeth 132 of the shaft 130, and, at the other end, three trunnions 137 on which part-spherical rollers 138 are mounted. The teeth 132 and 136 are slightly backed off in the known manner to form a coupling allowing transmission of torque at small angles of displacement between the axes X—X and Z—Z of the main shaft 130 and the shaft 135 of the tripod. The tripod is retained axially relative to the associated shaft by a thrust washer 139 held in position by an elastically-yieldable ring 140, and it also bears against the inner end of a cavity in the enlargement by a substantially part-spherical bearing surface 141. The complementary surfaces 139$^a$ and 142 of the washer 139 and tripod are also preferably part-spherical and concentric with the bearing surface 141.

The second shaft 150 which is here tubular carries a barrel 151 defining three raceways 152 of toric shape in which the rollers 138 are received. This barrel has a part-spherical outer surface 151$^a$ and is received in the bowl 133 so as to ensure a perfect centering of the joint.

Formed along the free edge 153 of the barrel 151, in the intermediate zones between two adjacent grooves, are cut-away faces 154 which are oriented at roughly 45° to the axis Y—Y of the shaft 150.

In an intermediate zone 143 between the trunnions and the teeth, the shaft section carrying the tripod is shaped in such manner as to constitute the envelope of the free edge 153 of the barrel when the joint operates at the maximum angle of displacement, this shaft section having in this zone a roughly triangular cross-sectional shape the corners of which are rounded. This section is shown in dot-dash lines in FIG. 4. It moreover varies along the shaft section of the tripod as can be seen in FIGS. 3 and 5 and the cut-away faces corresponding to the sides of the triangle also have a roughly triangular contour.

This embodiment of the joint operates in the following manner:

In respect of a maximum angular displacement of the shafts connected by the joint, the axis Y—Y of the shaft 150 makes with the axis Z—Z of the shaft 135 of the tripod an angle A which may reach 41 or 42°, and the axis Z—Z makes with the axis X—X of the shaft 130 an angle B which may be of the order of 5°. The maximum operating angle C of the joint therefore corresponds to the sum of the angles A and B and may be as much as, or even slightly more than, 46°. This feature of operation at a large angular displacement is of course added to the elimination of the circular motion of the axis of the shaft 150 about a mean position. Moreover, such a joint has increased torque-transmitting capacity for a relatively small overall size.

It will be understood that the illustrated secondary joint or coupling of the type having engaged teeth may be replaced by another type of joint of known type the performances of which are sufficient bearing in mind the required small angle of displacement. There may be mentioned, in particular, different types of flexible elastomer or steel bar couplings, the elementary joints or couplings of the universal or dog type.

Having now described our invention what we claim as new and desire to secure by Letters Patent is:

1. A tripod homokinetic joint comprising a first shaft, a second shaft, a first member constituting a tripod and connected to the first shaft and defining three trunnions, three part-spherical rollers respectively rotatably mounted on the trunnions, and a second member connected to said second shaft and defining three raceways in which said rollers are respectively received, the tripod being distinct from the first shaft, and an auxiliary homokinetic coupling capable of operating at an angle of displacement which is small relative to the maximum angle of displacement of said first and second shafts connecting the tripod to the first shaft.

2. A joint as claimed in claim 1, wherein said coupling comprises a member rigid with the first shaft and two complementary series of teeth respectively formed on the tripod and on said member rigid with the first shaft.

3. A joint as claimed in claim 1, comprising thrust means and axial retaining means interposed between the tripod and one of said shafts.

4. A joint as claimed in claim 1, comprising centering means interposed between the tripod and one of said shafts.

5. A joint as claimed in claim 1, wherein said first shaft comprises at an end thereof nearest to the joint an enlargement which is rigid with said first shaft and defines a cavity in which the tripod is at least partly received.

6. A joint as claimed in claim 5, wherein said enlargement defines an internal series of teeth in a part thereof nearest to said first shaft.

7. A joint as claimed in claim 5, wherein said enlargement has a cylindrical shape and comprises inner splines, teeth rigid with the tripod being complementary with and engaged with the splines, means being provided for centering and axially retaining the tripod with respect to said second member.

8. A joint as claimed in claim 5, wherein the enlargement comprises notches for the passage of the trunnions carried by the tripod.

9. A joint as claimed in claim 3, wherein the thrust means between the tripod and one of said shaft comprise at least one part-spherical bearing surface.

10. A joint as claimed in claim 3, wherein the axial retaining means comprise a ring, means for blocking the ring with respect to said one of said shafts, the ring defining a part-spherical bearing surface, and a complementary bearing surface on the tripod cooperating with the part-spherical surface.

11. A joint as claimed in claim 3, wherein the retaining means between the tripod and said one of said shafts are placed between an end of the tripod adjacent said one of said shafts and the trunnions of the tripod.

12. A joint as claimed in claim 3, wherein the retaining means between the tripod and said one of said shafts are placed at an end of the tripod the most remote from said one of said shafts.

13. A joint as claimed in claim 3, wherein the two shafts have complementary centering means comprising means defining two part-spherical bearing surfaces and respectively rigid with the first shaft and second shaft.

* * * * *